US012741653B2

(12) United States Patent
Komatsubara et al.

(10) Patent No.: US 12,741,653 B2
(45) Date of Patent: Sep. 22, 2026

(54) VEHICLE CONTROL DEVICE

(71) Applicant: HONDA MOTOR CO., LTD., Tokyo (JP)

(72) Inventors: Masaru Komatsubara, Tokyo (JP); Kotono Yuze, Tokyo (JP); Shun Furumoto, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 50 days.

(21) Appl. No.: 19/052,896

(22) Filed: Feb. 13, 2025

(65) Prior Publication Data

US 2025/0256725 A1 Aug. 14, 2025

(30) Foreign Application Priority Data

Feb. 14, 2024 (JP) ................................ 2024-020136

(51) Int. Cl.
*B60W 40/105* (2012.01)
*B60W 30/182* (2020.01)
(Continued)

(52) U.S. Cl.
CPC ........ *B60W 40/105* (2013.01); *B60W 30/182* (2013.01); *B60W 50/0205* (2013.01);
(Continued)

(58) Field of Classification Search
CPC . B60W 2050/0052; B60W 2050/0056; B60W 2050/0215; B60W 2420/503;
(Continued)

(56) References Cited

U.S. PATENT DOCUMENTS 5,123,714 A * 6/1992 Mori ........................ B60T 8/173
303/199
6,052,642 A * 4/2000 Wagner ................... B60T 8/172
701/70

(Continued)

FOREIGN PATENT DOCUMENTS

| | | |
|---|---|---|
| JP | 5020388 B2 | 9/2012 |
| JP | 6679348 B2 | 4/2020 |
| JP | 7105780 B2 | 7/2022 |

*Primary Examiner* — Carl C Staubach
(74) *Attorney, Agent, or Firm* — Paratus Law Group, PLLC

(57) ABSTRACT

A vehicle control device includes a wheel speed acquisition unit which acquires wheel speeds of wheels of a vehicle based on detection results of wheel speed sensors, an acceleration acquisition unit which acquires an acceleration in a longitudinal direction of the vehicle based on a detection result of an acceleration sensor, a calculation unit which calculates a first vehicle speed based on the wheel speeds of the wheels, an estimation unit which calculates a second vehicle speed estimated based on the first vehicle speed and the detected acceleration, and a slip determination unit which determines whether the vehicle is in a slip state. The estimation unit calculates the second vehicle speed by executing a limit process on the detected acceleration, and switches a mode of the limit process when it is determined that the vehicle is in the slip state during acceleration or deceleration of the vehicle.

10 Claims, 7 Drawing Sheets

(51) Int. Cl.
*B60W 50/02* (2012.01)
*B60W 50/00* (2006.01)

(52) U.S. Cl.
CPC ............... *B60W 2050/0056* (2013.01); *B60W 2050/0215* (2013.01); *B60W 2420/503* (2013.01); *B60W 2520/105* (2013.01); *B60W 2520/16* (2013.01); *B60W 2520/26* (2013.01); *B60W 2520/28* (2013.01)

(58) Field of Classification Search
CPC ....... B60W 2520/105; B60W 2520/16; B60W 2520/26; B60W 2520/28; B60W 2720/10; B60W 30/182; B60W 40/105; B60W 40/107; B60W 50/0205
See application file for complete search history.

(56) References Cited

U.S. PATENT DOCUMENTS

| | | | | |
|---|---|---|---|---|
| 2011/0257847 | A1* | 10/2011 | Uematsu | B60T 8/1769 701/50 |
| 2013/0131934 | A1 | 5/2013 | Uematsu et al. | |
| 2013/0131935 | A1 | 5/2013 | Uematsu et al. | |
| 2018/0178767 | A1* | 6/2018 | Chanda | B60R 16/0232 |

* cited by examiner

VEHICLE CONTROL DEVICE

CROSS-REFERENCE TO RELATED APPLICATIONS

This application is based on and claims priority under 35 USC 119 from Japanese Patent Application No. 2024-020136 filed on Feb. 14, 2024, the entire content of which is incorporated herein by reference.

TECHNICAL FIELD

The present disclosure relates to a vehicle control device.

BACKGROUND ART

In recent years, active efforts have been made to provide access to a sustainable transportation system in consideration of vulnerable people among traffic participants. In order to implement the above, focus has been placed on research and development on further improving safety and convenience of traffic by research and development related to driving assistance.

For example, JP7105780B, JP6679348B and JP5020388B disclose a device that estimates a vehicle speed based on a detection result of a wheel speed sensor and a longitudinal acceleration sensor provided in a vehicle and uses the estimated vehicle speed for various controls including driving assistance of the vehicle.

In a case where a vehicle is in a slip state, there is a possibility that a deviation occurs between a detection result of a longitudinal acceleration sensor and an actual acceleration of a vehicle body due to pitching of the vehicle, and a vehicle speed (estimated vehicle speed) estimated based on the longitudinal acceleration sensor is not high. Since an estimated vehicle speed with high accuracy is required for appropriate vehicle control in a slip state, it is required to improve calculation accuracy of the estimated vehicle speed.

SUMMARY OF INVENTION

The present disclosure provides a vehicle control device capable of improving calculation accuracy of an estimated value of a vehicle speed in a slip state of a vehicle.

An aspect of the present disclosure relates to a vehicle control device including:

- a wheel speed acquisition unit configured to acquire wheel speeds of a plurality of wheels of a vehicle based on detection results of wheel speed sensors;
- an acceleration acquisition unit configured to acquire an acceleration in a longitudinal direction of the vehicle based on a detection result of an acceleration sensor;
- a calculation unit configured to calculate a first vehicle speed of the vehicle based on the wheel speeds of the plurality of wheels detected by the wheel speed sensors;
- an estimation unit configured to calculate a second vehicle speed, which is an estimated value of a vehicle speed of the vehicle, based on the first vehicle speed and the acceleration detected by the acceleration sensor; and
- a slip determination unit configured to determine whether the vehicle is in a slip state,
- in which the estimation unit is configured to:
  - calculate the second vehicle speed by executing a predetermined limit process on the acceleration detected by the acceleration sensor; and
  - switch a mode of the limit process when it is determined that the vehicle is in the slip state during acceleration or deceleration of the vehicle.

According to the aspect of the present disclosure, it is possible to improve calculation accuracy of the estimated value of the vehicle speed in the slip state of the vehicle.

BRIEF DESCRIPTION OF DRAWINGS

Exemplary embodiment(s) of the present invention will be described in detail based on the following figures, wherein.

DESCRIPTION OF EMBODIMENTS

Figure 1:
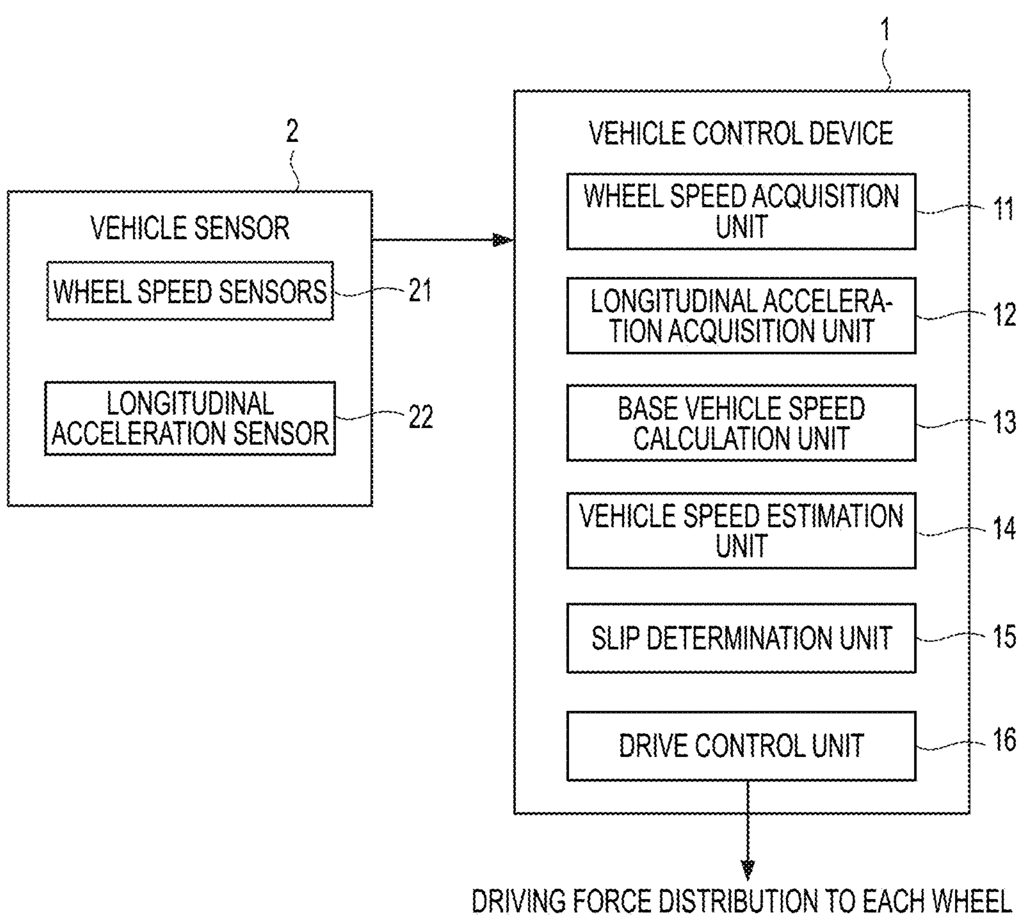
FIG. 1 is a block diagram showing a vehicle control device 1 according to an embodiment of the present disclosure.

FIG. 1 is a block diagram showing a vehicle control device 1 (hereinafter, also simply referred to as a control device 1) according to an embodiment of the present disclosure. The control device 1 is mounted on a vehicle such as a four-wheeled vehicle. The vehicle uses an internal combustion engine such as a diesel engine or a gasoline engine, an electric motor, or a combination thereof as a drive source. The vehicle is, for example, a four-wheel drive vehicle in which a rotational force generated by a drive source is distributed to front and rear wheels. The control device 1 controls driving force distribution to each wheel of the four-wheel drive vehicle.

The control device 1 communicates with a vehicle sensor 2 mounted on the vehicle, and receives signals indicating various types of information from the vehicle sensor 2. The control device 1 is implemented by a computer including a control calculation device, a storage device, and an input/output device as a physical configuration. The control calculation device is, for example, an electronic control unit (ECU) implemented by a controller such as a central processing unit (CPU), and controls the storage device and the input/output device while executing a calculation process. The storage device includes, for example, a main storage device and an auxiliary storage device. The main storage device is implemented by, for example, a random access memory (RAM). The auxiliary storage device is implemented by, for example, a read only memory (ROM). The input/output device includes, for example, an input device that receives data from the outside and transmits the data to the storage device, and an output device that outputs a calculation result calculated by the control calculation device and stored in the storage device to the outside.

For example, the control device 1 reads a program stored in the ROM into the RAM and executes the program read into the RAM by the CPU, thereby executing processes in a control flow to be described later. The control device 1 may have a physically different configuration from the above configuration.

The vehicle sensor 2 detects, for example, various data when the vehicle stops and travels. The vehicle sensor 2 includes, for example, wheel speed sensors 21 that detect wheel speeds of a plurality of wheels (right front wheel FR, left front wheel FL, right rear wheel RR, and left rear wheel RL), and a longitudinal acceleration sensor 22 that detects an acceleration (hereinafter, also referred to as a longitudinal acceleration) in a longitudinal direction that is a traveling direction of the vehicle. A plurality of the wheel speed sensors 21 are provided in a rotating unit in a drive system of the vehicle, and detect a wheel speed (specifically, a rotation speed) of each wheel. Each of the wheel speed sensors 21 transmits a signal including information on the detected wheel speed to the control device 1. Similarly, the longitudinal acceleration sensor 22 detects the acceleration in the longitudinal direction and transmits a signal including information on the detected acceleration to the control device 1.

Next, a functional configuration of the control device 1 will be described. The control device 1 includes a wheel speed acquisition unit 11, a longitudinal acceleration acquisition unit 12, a base vehicle speed calculation unit 13, a vehicle speed estimation unit 14, a slip determination unit 15, and a drive control unit 16. Each unit functions as the CPU executes the program.

The wheel speed acquisition unit 11 receives the signal from the wheel speed sensors 21 and acquires the wheel speeds of the plurality of wheels. The longitudinal acceleration acquisition unit 12 receives the signal from the longitudinal acceleration sensor 22 and acquires the longitudinal acceleration of the vehicle.

Figure 2:
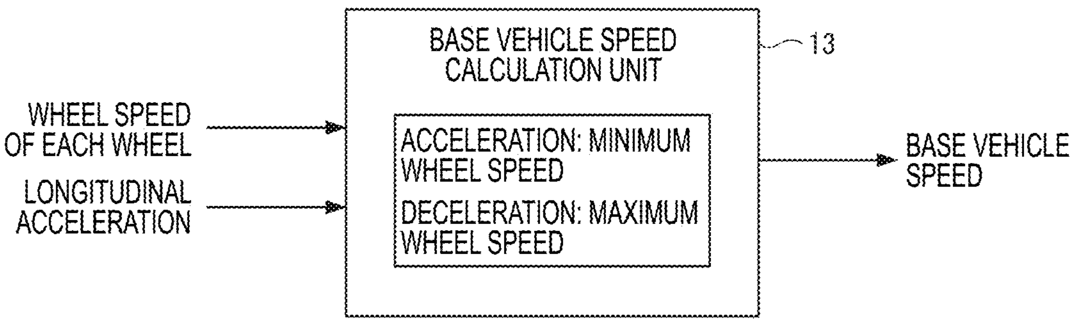
FIG. 2 is a block diagram illustrating calculation of a base vehicle speed.

The base vehicle speed calculation unit 13 calculates a base vehicle speed that is a speed of the vehicle based on the wheel speeds detected by the wheel speed sensors 21. FIG. 2 is a block diagram illustrating the calculation of the base vehicle speed. The base vehicle speed calculation unit 13 receives the wheel speeds of the wheels detected by the wheel speed sensors 21 and the longitudinal acceleration detected by the longitudinal acceleration sensor 22. In the present embodiment, the base vehicle speed calculation unit 13 sets a minimum wheel speed among the wheel speeds of the plurality of wheels as the base vehicle speed when the vehicle accelerates. On the other hand, the base vehicle speed calculation unit 13 sets a maximum wheel speed among the wheel speeds of the plurality of wheels as the base vehicle speed during deceleration of the vehicle.

Figure 3:
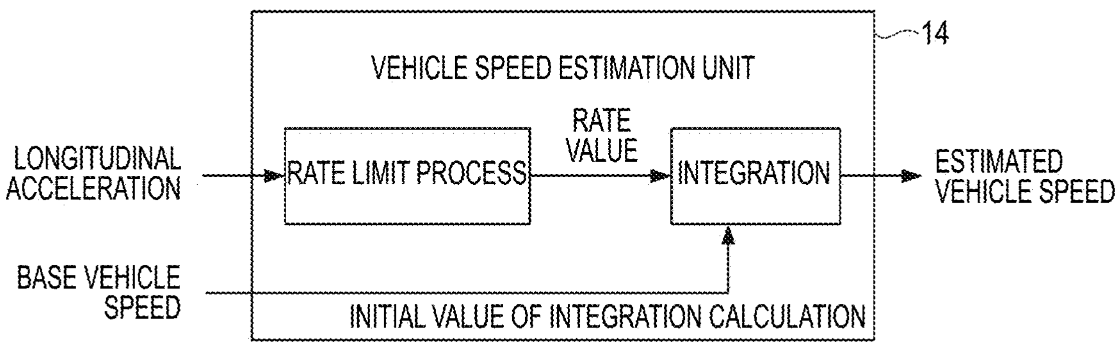
FIG. 3 is a block diagram illustrating calculation of an estimated vehicle speed.

The vehicle speed estimation unit 14 calculates an estimated vehicle speed that is an estimated value of a vehicle speed based on the base vehicle speed and the longitudinal acceleration. FIG. 3 is a block diagram illustrating the calculation of the estimated vehicle speed. The vehicle speed estimation unit 14 receives the longitudinal acceleration detected by the longitudinal acceleration sensor 22. The vehicle speed estimation unit 14 executes a rate limit process to be described later on the input longitudinal acceleration, and calculates a rate value of the estimated vehicle speed. Then, the vehicle speed estimation unit 14 integrates the rate value to calculate the estimated vehicle speed. At this time, a base vehicle speed at a predetermined time (for example, a base vehicle speed at the start of acceleration) is set as an initial value of the integration calculation.

The slip determination unit 15 determines whether the vehicle is in a slip state. Specifically, the slip determination unit 15 determines the slip state of the vehicle based on the base vehicle speed and the estimated vehicle speed.

Figure 4A:
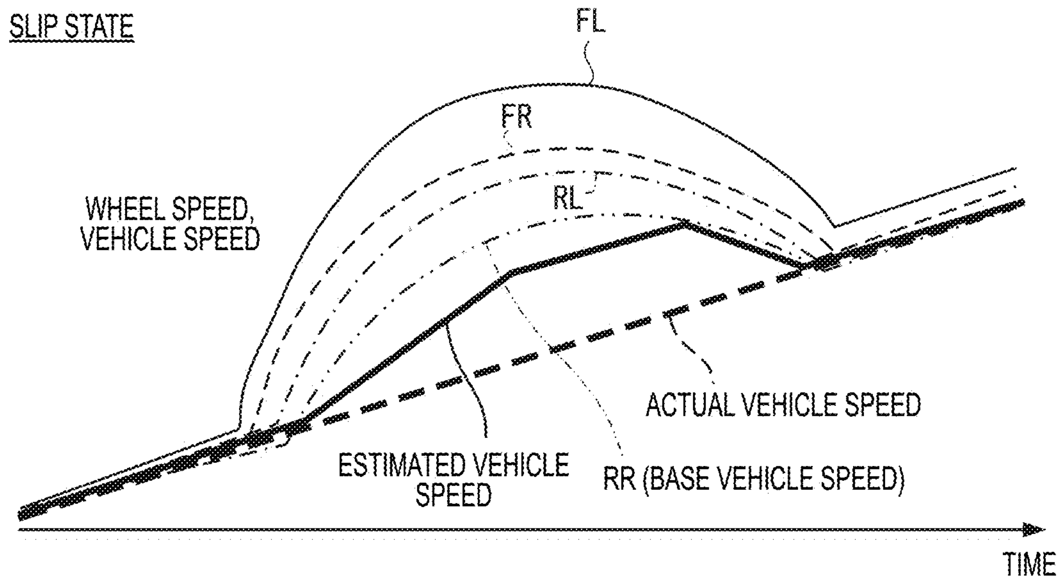
FIG. 4A shows an example of a graph of a time history of a wheel speed and a vehicle speed when a vehicle is in a slip state while the vehicle accelerates.
Figure 4B:
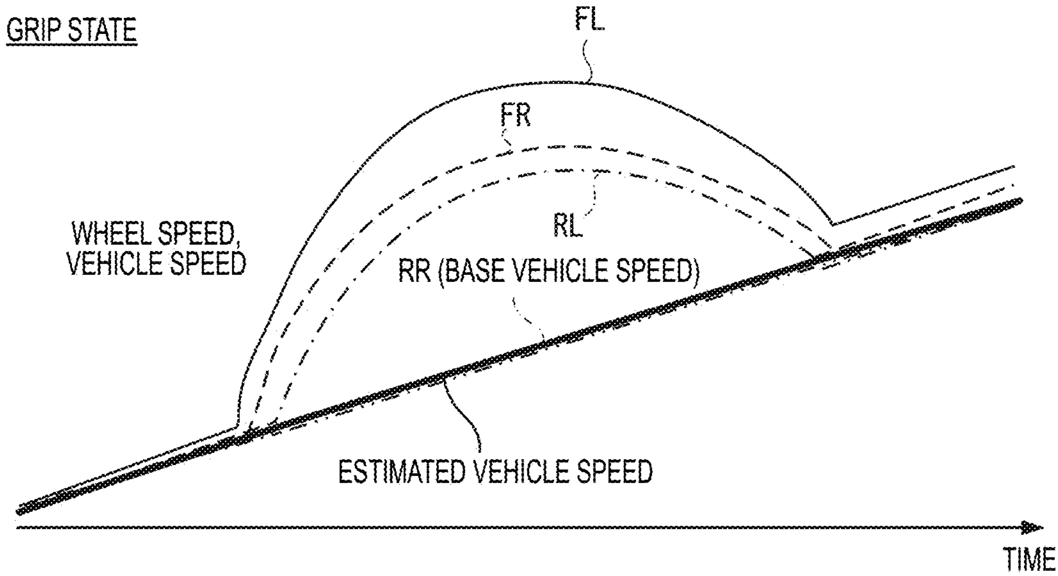
FIG. 4B shows an example of a graph of a time history of the wheel speed and the vehicle speed when the vehicle is in a grip state while the vehicle accelerates.

Here, the slip state is a state in which all the wheels of the vehicle are idling and are not gripping a road surface. On the other hand, a non-slip state (also referred to as a grip state) is a state in which at least one wheel is gripping the road surface. FIGS. 4A and 4B are graphs showing time histories of a wheel speed and a vehicle speed when the vehicle accelerates on, for example, a road surface with a low friction coefficient (for example, a road with frozen or snow-covered road surface, or an unpaved road). FIG. 4A shows a case where the vehicle is in a slip state, and FIG. 4B shows a case where a right rear wheel RR is in a grip state with the right wheel RR gripping the road surface. In each graph, a wheel speed of a left front wheel FL is indicated by a thin solid line, a wheel speed of a right front wheel FR is indicated by a thin broken line, a wheel speed of a left rear wheel RL is indicated by a one-dot chain line, a wheel speed of the right rear wheel RR is indicated by a two-dot chain line, an estimated vehicle speed calculated by the vehicle speed estimation unit 14 is indicated by a thick solid line, and an actual vehicle speed is indicated by a thick broken line. The wheel speed of each wheel is a sensor value detected by the wheel speed sensor 21 corresponding to the wheel.

In the graph of FIG. 4A, the wheel speeds of all the wheels are greater than the actual vehicle speed. The base vehicle speed calculation unit 13 calculates the wheel speed of the right rear wheel RR, which is the minimum wheel speed, as the base vehicle speed, and the vehicle speed estimation unit 14 calculates an estimated vehicle speed by integrating a longitudinal acceleration detected by the longitudinal acceleration acquisition unit 12 after the rate limit process. The slip determination unit 15 compares the base vehicle speed with the estimated vehicle speed, and determines that the vehicle is in the slip state when it is determined that the base vehicle speed is greater than the estimated vehicle speed.

In the graph of FIG. 4B, the right front wheel FR, the left front wheel FL, and the left rear wheel RL idle, and the wheel speeds thereof are greater than the actual vehicle speed, but the right rear wheel RR grips the road surface, and the wheel speed of the right rear wheel RR is substantially equal to the actual vehicle speed. The base vehicle speed calculation unit 13 calculates the wheel speed of the right rear wheel RR, which is the minimum wheel speed, as the base vehicle speed, and the vehicle speed estimation unit 14 calculates an estimated vehicle speed by integrating a longitudinal acceleration detected by the longitudinal acceleration sensor 22 after the rate limit process. The slip determination unit 15 compares the base vehicle speed with the estimated vehicle speed, and determines that the vehicle is not in the slip state when it is determined that the base vehicle speed is substantially equal to the estimated vehicle speed.

The determination of the slip state by the slip determination unit 15 is not limited to the above. For example, the slip determination unit 15 may determine whether the vehicle is in the slip state based on information from an outside air temperature sensor provided in the vehicle, information from a camera that detects a road with frozen or snow-covered road surface or an unpaved road, probe information acquired through communication with the outside of the vehicle, distortion information on a chassis of the vehicle, and the like.

Returning to FIG. 1, the drive control unit 16 controls a drive state of the vehicle based on the estimated vehicle speed estimated by the vehicle speed estimation unit 14. Specifically, when the vehicle is an all-wheel-drive vehicle, driving force distribution to the plurality of wheels is controlled based on the estimated vehicle speed.

Next, the rate limit process executed by the vehicle speed estimation unit 14 will be described in detail.

Figure 5:
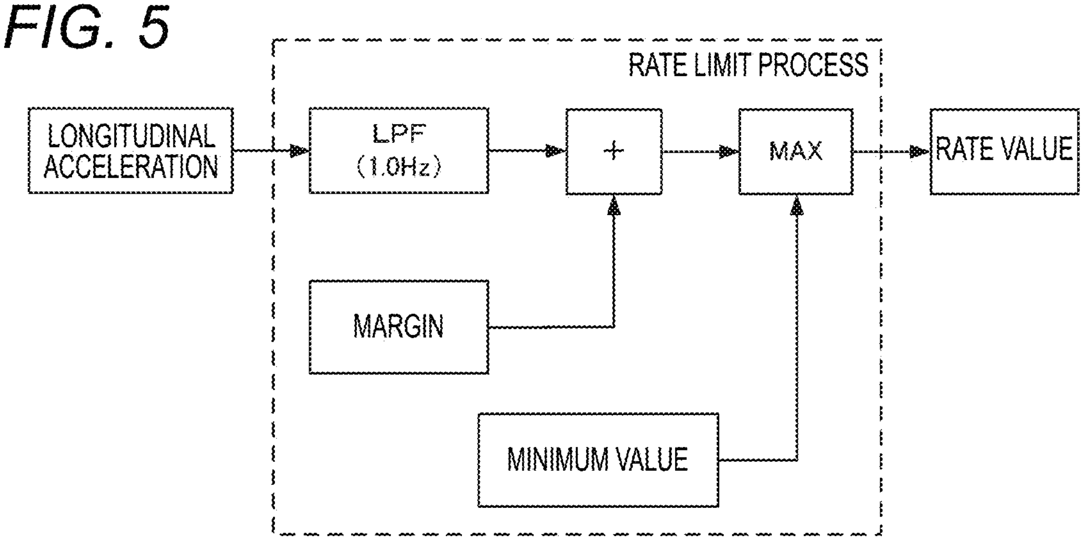
FIG. 5 is a block diagram showing an example of a rate limit process executed when the vehicle is in the grip state.

FIG. 5 is a block diagram illustrating the rate limit process executed by the vehicle speed estimation unit 14 when the vehicle is in the grip state. When the vehicle is not in the slip state, the control device 1 calculates the estimated vehicle speed based on the rate limit process shown in FIG. 5 until it is determined that the vehicle is in the slip state. When it is determined that the vehicle is in the slip state, the control device 1 switches to the rate limit process shown in FIG. 7 to be described later.

As shown in FIG. 5, the control device 1 executes a filtering process of applying a low-pass filter (also referred to as LPF in the figure) to the longitudinal acceleration, which is a sensor value detected by the longitudinal acceleration sensor 22, and gradually reducing (removing) a frequency component equal to or greater than a predetermined threshold value included in the sensor value. For example, the control device 1 can reduce noise included in the sensor value by setting the predetermined threshold value, that is, a cutoff frequency, to 1.0 Hz, for example, and gradually reducing a frequency component of 1.0 Hz or more included in the sensor value.

The control device 1 adds a predetermined margin to the longitudinal acceleration after the low-pass filter. The addition of the margin takes into consideration a deviation of the sensor value of the longitudinal acceleration sensor 22.

Further, the control device 1 sets a minimum value of the rate value as a measure for when the longitudinal acceleration is canceled out on a road having a slope, such as an uphill or downhill slope. Then, the control device 1 outputs, as the rate value, a maximum value among the value obtained by applying the low-pass filter and the margin addition to the sensor value of the longitudinal acceleration and the minimum value of the rate value.

As described above, the rate value is calculated by executing the rate limit process on the longitudinal acceleration, which is the sensor value, so that it is possible to prevent a sudden fluctuation component from being included in the estimated vehicle speed obtained by integrating the rate value.

Figure 6A:
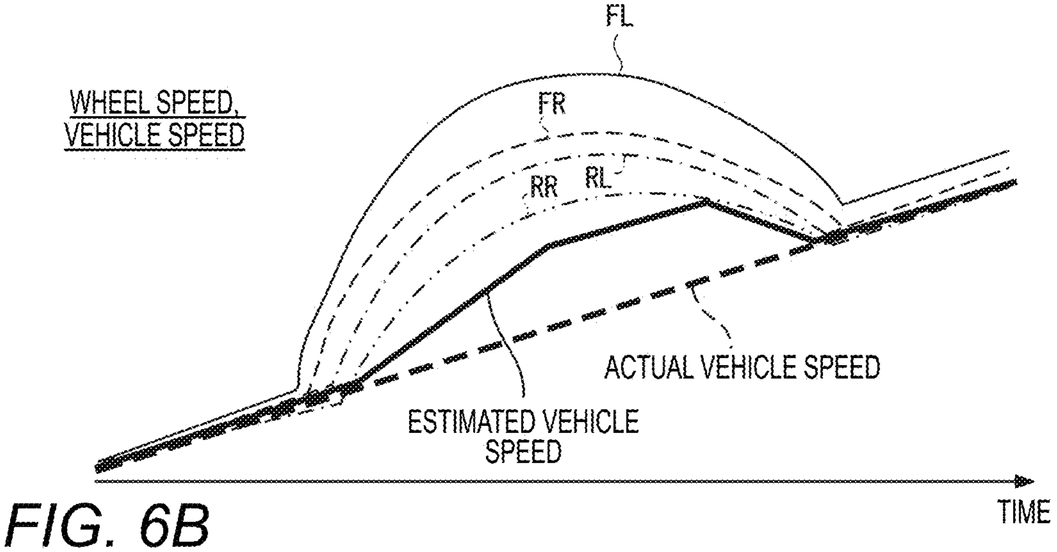
FIG. 6A shows a graph of a time history of the wheel speed and the vehicle speed when the vehicle is in the slip state while the vehicle accelerates.
Figure 6B:
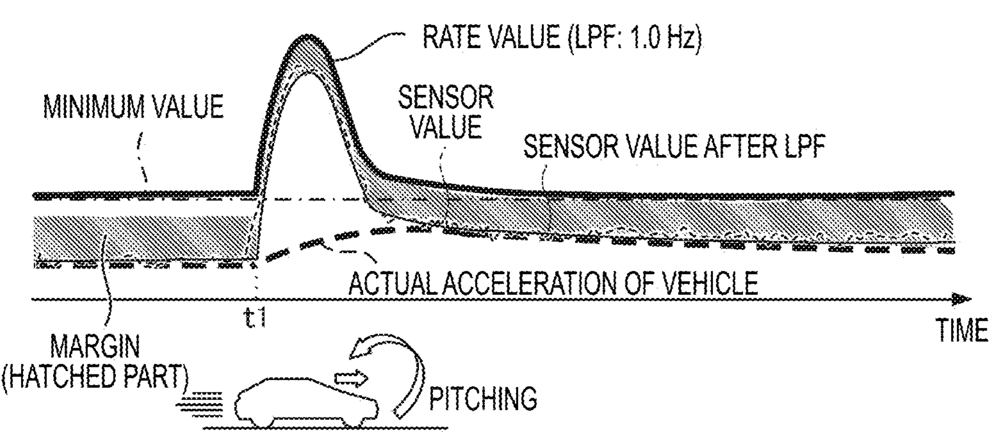
FIG. 6B shows a graph of a time history of a longitudinal acceleration when the vehicle is in the slip state while the vehicle accelerates.

FIG. 6A shows a graph of a time history of the wheel speed and the vehicle speed when the vehicle is in the slip state while the vehicle accelerates on a road surface with a low friction coefficient, for example. FIG. 6B shows a graph of a time history of the longitudinal acceleration when the vehicle is in the slip state while the vehicle accelerates on the road surface with a low friction coefficient, for example. The graph in FIG. 6A is the same as the graph in FIG. 4A. In the graph in FIG. 6B, the sensor value detected by the longitudinal acceleration sensor 22 is indicated by a thin broken line, the sensor value subjected to the low-pass filter is indicated by a thin solid line, the above margin is indicated by a hatched region, the above minimum value of the rate value is indicated by a one-dot chain line, the finally calculated rate value is indicated by a thick solid line, and an actual longitudinal acceleration of the vehicle is indicated by a thick broken line. FIGS. 6A and 6B show a case where the estimated vehicle speed is calculated by the rate limit process based on FIG. 5, that is, the cutoff frequency of the low-pass filter is set to 1.0 Hz.

As shown in FIGS. 6A and 6B, the sensor value of the longitudinal acceleration significantly increases at a time t1. This is because the sensor value of the longitudinal acceleration increases due to pitching of the vehicle (that is, tilt of the vehicle in the longitudinal direction) that occurs as a result of the vehicle in the slip state at the time t1. Although the sensor value of the longitudinal acceleration significantly increases, an actual acceleration of a vehicle body in the longitudinal direction does not significantly increase because the vehicle is in the slip state and the wheels are idling. The increase in the sensor value of the longitudinal acceleration caused by the pitching is one of causes of a deviation between the rate value and the actual acceleration of the vehicle body, and in this case, the estimated vehicle speed calculated by integrating the rate value is greater than the actual vehicle speed.

Therefore, when it is determined that the vehicle is in the slip state during acceleration, the control device 1 switches a mode of the rate limit process. Specifically, when it is determined that the vehicle is in the slip state during acceleration, the control device 1 switches the rate limit process to a mode of suppressing an influence of the longitudinal acceleration caused by the pitching of the vehicle.

Figure 7:
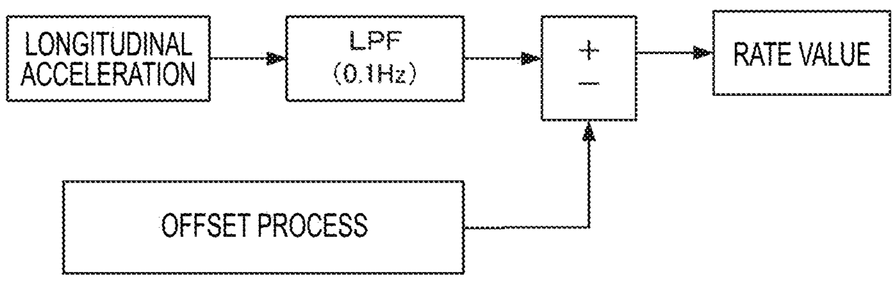
FIG. 7 is a block diagram showing an example of the rate limit process executed when the vehicle is in the slip state.
Figure 8:
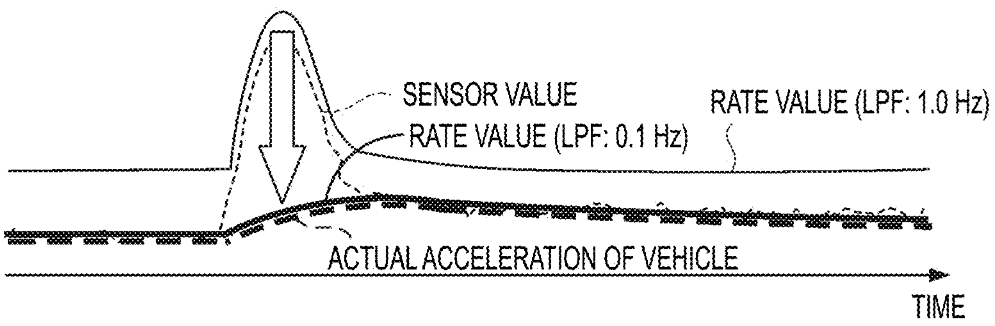
FIG. 8 is a graph showing a change in a rate value when a cutoff frequency of a low-pass filter is changed from 1.0 Hz to 0.1 Hz in the rate limit process.

Specifically, as shown in FIG. 7, when it is determined that the vehicle is in the slip state during acceleration, the control device 1 changes the cutoff frequency of the low-pass filter from 1.0 Hz to 0.1 Hz, and executes a filtering process of gradually reducing (removing) a frequency component of 0.1 Hz or more included in the detected longitudinal acceleration. By decreasing the cutoff frequency, as shown in FIG. 8, the control device 1 can calculate the rate value in which the increase in the sensor value caused by the pitching is gradually reduced. Thus, as compared with a case where the cutoff frequency is set to 1.0 Hz, the rate value can be made closer to the actual acceleration of the vehicle body, and calculation accuracy of the estimated vehicle speed in the slip state of the vehicle can be improved. As a result, the control device 1 can appropriately control the drive state of the vehicle.

As shown in FIGS. 6A and 6B, when the vehicle is in the slip state, the margin added to the sensor value of the longitudinal acceleration is also one of the causes of the deviation between the rate value and the actual acceleration of the vehicle body. Therefore, as shown in FIG. 7, in the case where it is determined that the vehicle is in the slip state during acceleration, the control device 1 executes an offset process of canceling the addition of the margin. Accordingly, as shown in FIG. 8, the rate value calculated by the rate limit process can be made further closer to the actual acceleration of the vehicle body, and the calculation accuracy of the estimated vehicle speed in the slip state of the vehicle can be improved.

The offset process may include a process of canceling the longitudinal acceleration detected when the vehicle stops from the acceleration detected when the vehicle accelerates, in addition to the process of canceling the margin. Specifically, the control device 1 may include a process of learning a sensor value deviation from a detection result of the longitudinal acceleration sensor 22 detected every time the vehicle stops, and canceling the sensor value deviation from the acceleration detected when the vehicle accelerates. Accordingly, the acceleration detected by the acceleration sensor can be made closer to the actual acceleration of the vehicle body.

Figure 9:
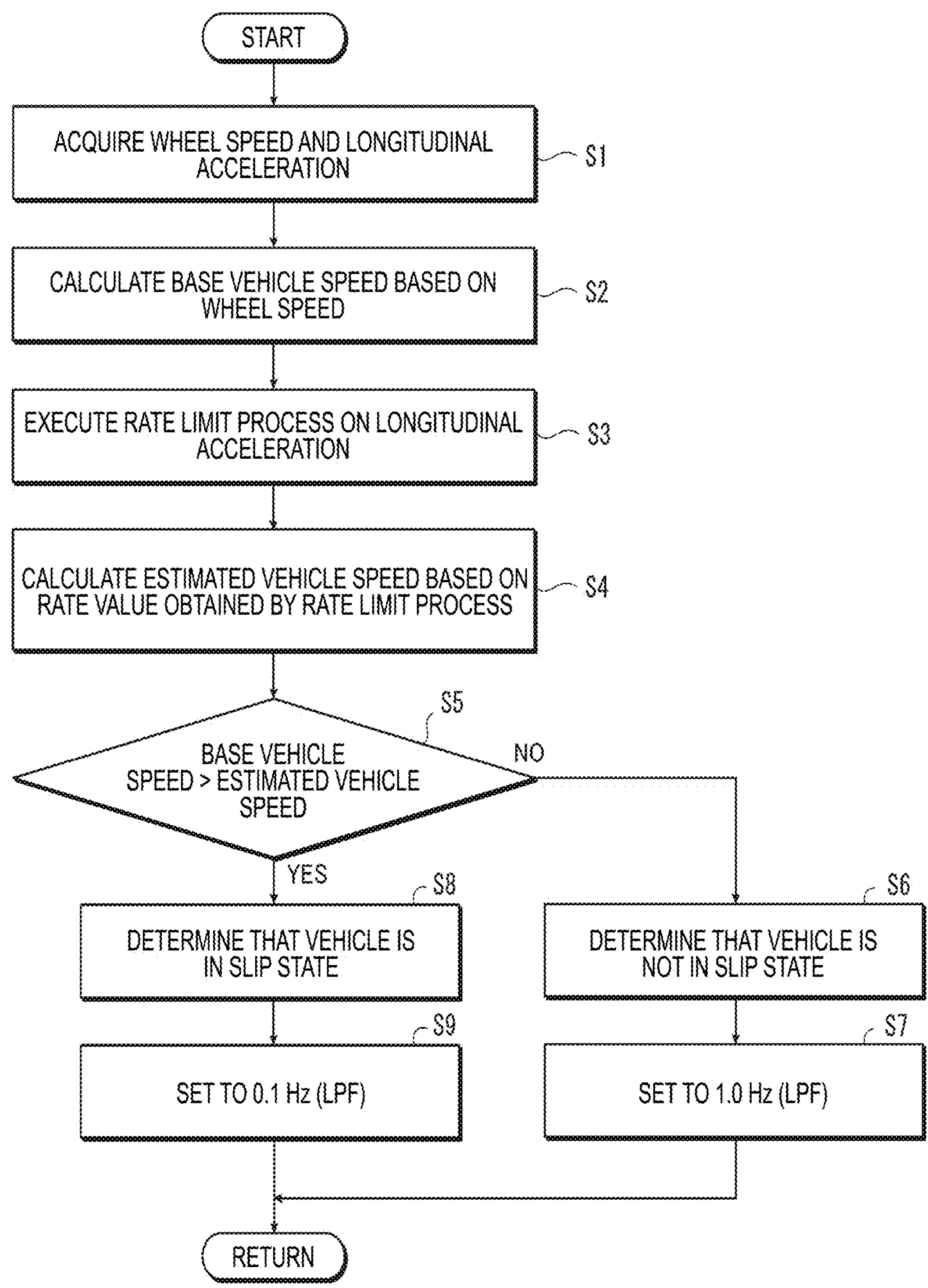
FIG. 9 shows a control flow for switching the rate limit process.

FIG. 9 shows an example of the control flow executed by the control device 1. The control device 1 receives detection results from the wheel speed sensors 21 and the longitudinal acceleration sensor 22 to acquire wheel speeds and a longitudinal acceleration (step S1). The control device 1 calculates a base vehicle speed based on the acquired wheel speed (step S2).

Next, the control device 1 executes the rate limit process on the acquired longitudinal acceleration (step S3). At this time, if the vehicle is not determined to be in the slip state, the control device 1 executes the rate limit process in a state where the cutoff frequency of the low-pass filter of the rate limit process is set to 1.0 Hz which is a value at the normal time. Then, the control device 1 calculates an estimated vehicle speed based on a rate value obtained by the rate limit process (step S4).

Next, the control device 1 determines whether the base vehicle speed is greater than the estimated vehicle speed (step S5). When it is determined that the base vehicle speed is not greater than the estimated vehicle speed and is substantially equal to the estimated vehicle speed (step S5: NO), the control device 1 determines that the vehicle is not in a slip state, that is, in a grip state (step S6), and sets the cutoff frequency of the low-pass filter to 1.0 Hz (step S7). On the other hand, when it is determined that the base vehicle speed is greater than the estimated vehicle speed (step S5: YES), the control device 1 determines that the vehicle is in the slip state (step S8), and sets the cutoff frequency of the low-pass filter to 0.1 Hz (step S9).

In the above description, the control device 1 calculates the estimated vehicle speed based on the detection result of the longitudinal acceleration sensor 22, but when an abnormality (failure) of the longitudinal acceleration sensor 22 is detected, a configuration may be considered in which the rate value is calculated based on a total driving force of the vehicle without using the detection result of the longitudinal acceleration sensor 22.

Figure 10:
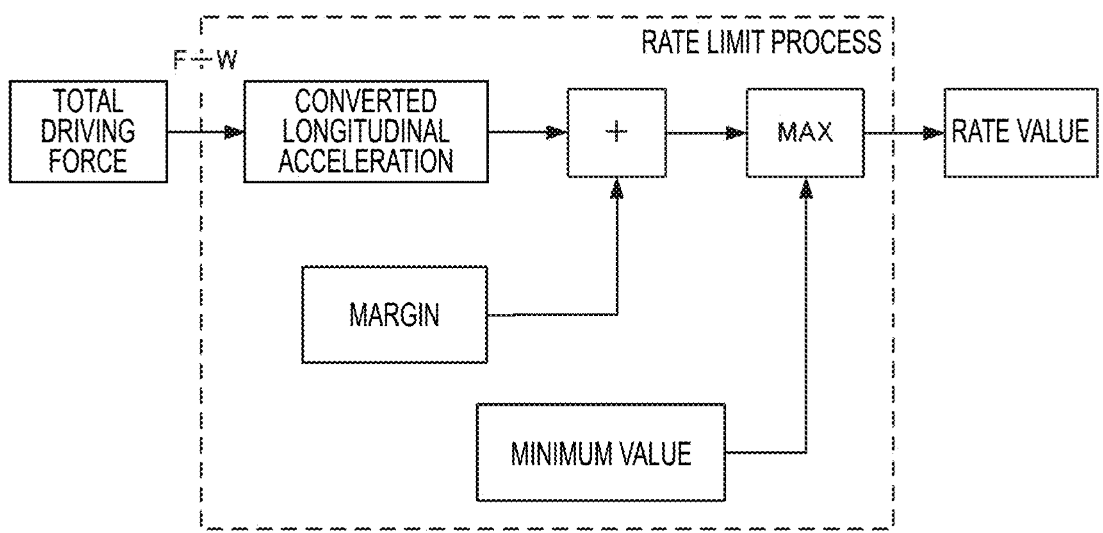
FIG. 10 is a block diagram showing an example of the rate limit process when it is determined that the vehicle is not in the slip state in a case where an abnormality of a longitudinal acceleration sensor 22 is detected.

FIG. 10 is a block diagram showing an example of the rate limit process when it is determined that the vehicle is not in the slip state in a case where an abnormality of the longitudinal acceleration sensor 22 is detected. In this case, the control device 1 sets the total driving force of the vehicle as an input value of the rate limit process. More specifically, the control device 1 calculates a longitudinal acceleration (also referred to as a converted longitudinal acceleration) converted from the total driving force and a vehicle weight by dividing, by the vehicle weight, a value obtained by subtracting a rolling resistance and an air resistance of the vehicle from the total driving force. While the vehicle stops, the control device 1 sets the converted longitudinal acceleration to zero. The vehicle weight may be a weight of a vehicle itself, or may be a weight in consideration of a weight of an occupant in advance.

The control device 1 does not execute the filtering process using the low-pass filter on the converted longitudinal acceleration, but adds a margin to the converted longitudinal acceleration. Then, the control device 1 outputs, as the rate value, a maximum value among a value obtained by adding the margin to the converted longitudinal acceleration and a minimum value of the rate value, and calculates the estimated vehicle speed based on the rate value.

On the other hand, when an abnormality of the longitudinal acceleration sensor 22 is detected, and it is determined that the vehicle is in the slip state, the control device 1 uses a fixed value prepared in advance as the rate value. The fixed value is, for example, an acceleration equivalent to a frozen road surface (for example, about 0.007 $m/s^2$ to 0.01 $m/s^2$). The control device 1 calculates the estimated vehicle speed based on the rate value which is the fixed value.

As described above, even when an abnormality of the longitudinal acceleration sensor 22 is detected, and an appropriate sensor value of the longitudinal acceleration cannot be acquired, the control device 1 can calculate the rate value, and as a result, can calculate the estimated vehicle speed.

For example, the control device 1 may determine an abnormality of the longitudinal acceleration sensor 22 when a failure signal is acquired from the longitudinal acceleration sensor 22, or may determine an abnormality of the longitudinal acceleration sensor 22 when a detection value of the longitudinal acceleration sensor 22 exceeds an abnormality determination threshold value.

Although an embodiment of the present disclosure has been described above with reference to the accompanying drawings, it is needless to say that the present invention is not limited to the embodiment. It is apparent to those skilled in the art that various changes or modifications can be conceived within the scope described in the claims, and it is understood that the changes or modifications naturally fall within the technical scope of the present invention. In addition, the constituent elements in the above embodiment may be freely combined without departing from the gist of the invention.

For example, in the above embodiment, the control by the control device 1 when the vehicle accelerates has been described as an example, but the present invention is not limited thereto, and similar control can also be performed when the vehicle is decelerating.

In the present specification, at least the following matters are described. In the parentheses, the corresponding constituent elements and the like in the above embodiment are shown as examples, but the present invention is not limited thereto.

(1) A vehicle control device (vehicle control device 1) including:

a wheel speed acquisition unit (wheel speed acquisition unit 11) configured to acquire wheel speeds of a plurality of wheels of a vehicle based on detection results of wheel speed sensors (wheel speed sensors 21);

an acceleration acquisition unit (longitudinal acceleration acquisition unit 12) configured to acquire an acceleration in a longitudinal direction of the vehicle based on a detection result of an acceleration sensor (longitudinal acceleration sensor 22);

a calculation unit (base vehicle speed calculation unit 13) configured to calculate a first vehicle speed (base vehicle speed) of the vehicle based on the wheel speeds of the plurality of wheels detected by the wheel speed sensors;

an estimation unit (vehicle speed estimation unit 14) configured to calculate a second vehicle speed (estimated vehicle speed), which is an estimated value of a vehicle speed of the vehicle, based on the first vehicle speed and the acceleration detected by the acceleration sensor; and a slip determination unit (slip determination unit 15) configured to determine whether the vehicle is in a slip state, in which the estimation unit is configured to:

calculate the second vehicle speed by executing a predetermined limit process on the acceleration detected by the acceleration sensor; and switch a mode of the limit process when it is determined that the vehicle is in the slip state during acceleration or deceleration of the vehicle.

According to (1), when the vehicle is in the slip state during acceleration or deceleration of the vehicle, it is possible to improve calculation accuracy of the second vehicle speed (estimated value of the vehicle speed) in the slip state of the vehicle since the mode of the limit process executed on the detected acceleration is switched.

(2) The vehicle control device according to (1), in which the limit process includes a filtering process of gradually reducing a frequency component of the acceleration detected by the acceleration sensor, the frequency component being equal to or greater than a predetermined threshold value, and the estimation unit is configured to:

set the predetermined threshold value to a first threshold value (1.0 Hz) in a case where it is determined that the vehicle is not in the slip state during acceleration or deceleration of the vehicle; and set the predetermined threshold value to a second threshold value (0.1 Hz), which is less than the first threshold value, in a case where it is determined that the vehicle is in the slip state during acceleration or deceleration of the vehicle.

According to (2), when it is determined that the vehicle is in the slip state during acceleration or deceleration of the vehicle, the influence of the acceleration caused by pitching of the vehicle can be suppressed since the predetermined threshold value of the filtering process is set to the second threshold value less than the first threshold value.

(3) The vehicle control device according to (1) or (2), in which the slip determination unit is configured to:

determine that the vehicle is not in the slip state in a case where at least one wheel is gripping a road surface; and determine that the vehicle is in the slip state in a case where all the wheels are not gripping the road surface.

According to (3), it is possible to appropriately determine the slip state according to a state of the wheels.

(4) The vehicle control device according to any one of (1) to (3), in which when the vehicle accelerates, the calculation unit is configured to calculate a minimum wheel speed among the wheel speeds of the plurality of wheels as the first vehicle speed.

According to (4), the first vehicle speed can be calculated closer to an actual vehicle speed when the vehicle accelerates.

(5) The vehicle control device according to (4), in which the slip determination unit is configured to:

determine that the vehicle is in the slip state in a case where the second vehicle speed is greater than the first vehicle speed; and determine that the vehicle is not in the slip state in a case where the second vehicle speed is substantially equal to the first vehicle speed.

According to (5), it is possible to appropriately determine the slip state based on the first vehicle speed on the basis of the detected wheel speeds and the second vehicle speed on the basis of the detected acceleration.

(6) The vehicle control device according to any one of (1) to (5), in which the limit process includes a process of canceling an acceleration detected when the vehicle stops from an acceleration detected during acceleration or deceleration of the vehicle.

According to (6), since the acceleration detected by the acceleration sensor can be made closer to an actual acceleration of the vehicle, the calculation accuracy of the second vehicle speed in the slip state of the vehicle can be further improved.

(7) The vehicle control device according to any one of (1) to (6), further including:

a drive control unit (drive control unit 16) configured to control a drive state of the vehicle, in which the drive control unit is configured to control the drive state based on the second vehicle speed.

According to (7), since the accuracy of the second vehicle speed is high even when the vehicle is in the slip state, the drive state of the vehicle can be appropriately controlled when the vehicle is in the slip state.

(8) The vehicle control device according to (7), in which the vehicle is an all-wheel-drive vehicle, and the drive control unit is configured to control driving force distribution to the plurality of wheels of the vehicle based on the second vehicle speed.

According to (8), since the accuracy of the second vehicle speed is high even when the vehicle is in the slip state, it is possible to appropriately control the driving force distribution to the plurality of wheels when the vehicle is in the slip state.

(9) The vehicle control device according to any one of (1) to (8), in which when it is determined that the vehicle is in the slip state during acceleration or deceleration of the vehicle, the estimation unit is configured to switch the limit process to a mode of suppressing an influence of the acceleration caused by pitching of the vehicle.

According to (9), when the vehicle is in the slip state during acceleration or deceleration of the vehicle, the limit process executed on the detected acceleration is switched to the mode of suppressing the influence of the acceleration caused by the pitching of the vehicle. Therefore, the calculation accuracy of the second vehicle speed (estimated value of the vehicle speed) when the vehicle is in the slip state can be improved.

(10) The vehicle control device according to any one of (1) to (9), in which the estimation unit is configured to calculate the second vehicle speed based on an acceleration that is a fixed value prepared in advance, in a case where an abnormality of the acceleration sensor is detected and it is determined that the vehicle is in the slip state during acceleration or deceleration of the vehicle.

According to (10), the second vehicle speed can be appropriately calculated even when the acceleration sensor is abnormal.

What is claimed is:

1. A vehicle control device comprising:

a wheel speed acquisition unit configured to acquire wheel speeds of a plurality of wheels of a vehicle based on detection results of wheel speed sensors;

an acceleration acquisition unit configured to acquire an acceleration in a longitudinal direction of the vehicle based on a detection result of an acceleration sensor;

a calculation unit configured to calculate a first vehicle speed of the vehicle based on the wheel speeds of the plurality of wheels detected by the wheel speed sensors;

an estimation unit configured to calculate a second vehicle speed, which is an estimated value of a vehicle speed of the vehicle, based on the first vehicle speed and the acceleration detected by the acceleration sensor; and a slip determination unit configured to determine whether the vehicle is in a slip state, wherein the estimation unit is configured to:

calculate the second vehicle speed by executing a predetermined limit process on the acceleration detected by the acceleration sensor; and switch a mode of the limit process when it is determined that the vehicle is in the slip state during acceleration or deceleration of the vehicle.

2. The vehicle control device according to claim 1, wherein the limit process includes a filtering process of gradually reducing a frequency component of the acceleration detected by the acceleration sensor, the frequency component being equal to or greater than a predetermined threshold value, and the estimation unit is configured to:

set the predetermined threshold value to a first threshold value in a case where it is determined that the vehicle is not in the slip state during acceleration or deceleration of the vehicle; and set the predetermined threshold value to a second threshold value, which is less than the first threshold value, in a case where it is determined that the vehicle is in the slip state during acceleration or deceleration of the vehicle.

3. The vehicle control device according to claim 1, wherein the slip determination unit is configured to:

determine that the vehicle is not in the slip state in a case where at least one wheel is gripping a road surface; and determine that the vehicle is in the slip state in a case where all the wheels are not gripping the road surface.

4. The vehicle control device according to claim 1, wherein when the vehicle accelerates, the calculation unit is configured to calculate a minimum wheel speed among the wheel speeds of the plurality of wheels as the first vehicle speed.

5. The vehicle control device according to claim 4, wherein the slip determination unit is configured to:

determine that the vehicle is in the slip state in a case where the second vehicle speed is greater than the first vehicle speed; and determine that the vehicle is not in the slip state in a case where the second vehicle speed is substantially equal to the first vehicle speed.

6. The vehicle control device according to claim 1, wherein the limit process includes a process of canceling an acceleration detected when the vehicle stops from an acceleration detected during acceleration or deceleration of the vehicle.

7. The vehicle control device according to claim 1, further comprising:

a drive control unit configured to control a drive state of the vehicle, wherein the drive control unit is configured to control the drive state based on the second vehicle speed.

8. The vehicle control device according to claim 7, wherein the vehicle is an all-wheel-drive vehicle, and the drive control unit is configured to control driving force distribution to the plurality of wheels of the vehicle based on the second vehicle speed.

9. The vehicle control device according to claim 1, wherein when it is determined that the vehicle is in the slip state during acceleration or deceleration of the vehicle, the estimation unit is configured to switch the limit process to a mode of suppressing an influence of the acceleration caused by pitching of the vehicle.

10. The vehicle control device according to claim 1, wherein the estimation unit is configured to calculate the second vehicle speed based on an acceleration that is a fixed value prepared in advance, in a case where an abnormality of the acceleration sensor is detected and it is determined that the vehicle is in the slip state during acceleration or deceleration of the vehicle.

* * * * *